United States Patent

Otani et al.

[11] 4,158,105
[45] Jun. 12, 1979

[54] CLOCK EXTRACTION DEVICE FOR DOUBLE-BINARY PHASE-SHIFT KEYING SYSTEM

[75] Inventors: Susumu Otani; Toshitake Noguchi, both of Tokyo, Japan

[73] Assignee: Nippon Electric Company, Ltd., Tokyo, Japan

[21] Appl. No.: 798,358

[22] Filed: May 19, 1977

[30] Foreign Application Priority Data

May 21, 1976 [JP] Japan .................. 51-59304

[51] Int. Cl.² .......................................... H04B 1/06
[52] U.S. Cl. ........................ 178/69.1; 178/88;
 325/344; 325/351; 329/110; 178/67
[58] Field of Search ............ 178/88, 67, 69.1;
 325/344, 351, 320, 322, 65; 329/110, 112;
 179/15 BP

[56] References Cited

U.S. PATENT DOCUMENTS

| B 498,775 | 3/1976 | Balcewicz | 325/320 |
| 3,745,458 | 7/1973 | Nakamura | 178/88 |
| 3,753,114 | 8/1973 | Burley | 178/88 |
| 3,835,404 | 9/1974 | Nakamura | 178/88 |
| 4,015,083 | 3/1977 | Bellisio | 178/69.1 |
| 4,039,961 | 8/1977 | Ishio | 325/320 |

*Primary Examiner*—Robert L. Griffin
*Assistant Examiner*—Michael A. Masinick
*Attorney, Agent, or Firm*—Ostrolenk, Faber, Gerb & Soffen

[57] ABSTRACT

A circuit for extracting a clock signal from a double-binary phase-shift keying system is disclosed. The carrier wave form is regenerated at the receiver from the phase-shift keyed (PSK) signal input. The regenerated carrier wave is frequency doubled and frequency mixed with the PSK input signal which has also been frequency doubled. A desired clock signal is thereafter extracted from the mixed signal by a band-pass filter. The system does not include a frequency divider which would result in a phase ambiguity.

4 Claims, 4 Drawing Figures

CLOCK EXTRACTION DEVICE FOR DOUBLE-BINARY PHASE-SHIFT KEYING SYSTEM

BACKGROUND OF THE INVENTION

This invention relates to devices for extracting from a double-binary phase-shift keyed (PSK) signal the clock frequency of the base band signal thereof.

Four-phase PSK transmission systems have previously been used for transmission of digital information. Recently a double-binary PSK system has been proposed as a system which is resistant to the deteriorating effects of a nonlinear transmission channel. Modulation of this type are a modification of the conventional four-phase PSK system in which the modulated signal is formed using two base band signals which are out of phase by an amount of time corresponding to half the length of the time slot. For details of this modulation system, reference may be had, for example, to the article, "The Effects of Filtering and Limiting a Double-Binary PSK Signal," by Robert K. Kwan, "IEEE Transactions on Aerospace and Electronic Systems," Vol. AES-5, No. 4, July 1969, pp. 589–594. In a digital phase-modulation system, the clock signal must be extracted from the modulated wave at the receiving end of the system to provide time slot information. However, many of the clock extraction devices previously used in a four-phase digital PSK system (in which principally no phase change is effected every half time slot) cannot be used, without modication, in a double-binary PSK system.

For a double-binary PSK system, a method of clock extraction may be contemplated in which the modulated signal is frequency-doubled and, from the resulting signal having a frequency of $2f_c$, two signals, $2f_c+f_s$ and $2f_c-f_s$, both including the clock frequency $f_s$, are separated out. The two signals so separated are mixed to produce a signal $2f_s$ and, by halving the frequency of this signal, the clock frequency $f_s$ is readily obtainable. Such clock extraction, however, inherently involves a phase ambiguity of 180° since the clock is regenerated through a ½ frequency divider, and again the clock regenerated cannot be utilized immediately as it is.

SUMMARY OF THE INVENTION

In view of the above, a primary object of the present invention is the provision of a clock extraction device for a double-binary PSK system which is capable of extracting the clock signal in a stable and directly utilizable form.

According to the present invention, there is provided for a double-binary PSK system, a clock extraction device which comprises a carrier-wave regenerating circuit designed to regenerate the carrier wave of a double-binary PSK signal input thereto, a first multiplier circuit for frequency-doubling the regenerated carrier wave, a second multiplier circuit for doubling the carrier-frequency of the double-binary PSK signal input, a mixer for frequency-mixing the outputs of said first and second multiplier circuits, and filter means for extracting from the output of said mixer a clock signal as included in the double-binary PSK signal input.

According to the principles of the present invention, a carrier wave is regenerated from a double-binary PSK signal and the frequency of the regenerated carrier wave is doubled to obtain a signal having a frequency $2f_c$. On the other hand, the band-limited double-binary PSK signal input is frequency-doubled to produce frequency spectrum components with a certain spread centering on $2f_c$ and two other components of virtually no spread respectively at $2f_c+f_s$ and $2f_c-f_s$, which components are frequency-mixed with the signal of $2f_c$ in order to obtain a clock pulse of frequency $f_s$. As an alternative, the input signal itself, not in the form divided into two signals, $2f_c+f_s$ and $2f_c-f_s$, may be frequency-mixed with the signal $2f_c$ and the clock taken out of the mixer output through a narrow-band filter, or the signals of $2f_c+f_s$ and $2f_c-f_s$ may be selected out through respective narrow-band filters and the combination of the two signals frequency-mixed with the multiplied carrier signals $2f_c$. In the latter case, the clock of $f_s$ can be selected out of the mixer output through a filter of relatively wide bandwidth.

The above and other objects, features and advantages of the present invention will be apparent from the following more detailed description when taken in conjunction with the accompanying drawings.

DESCRIPTION OF THE PREFERRED EMBODIMENTS

Figure 1:
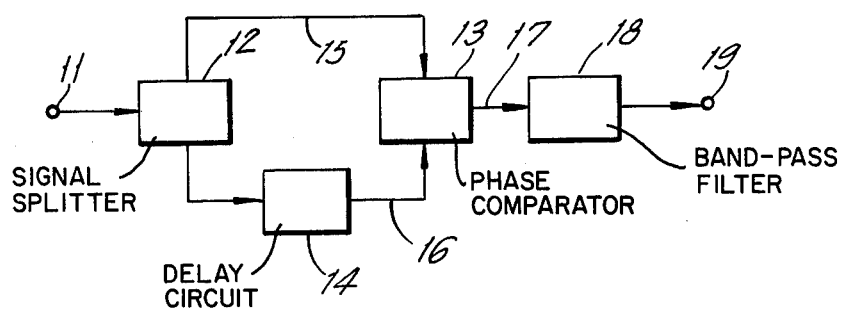
FIG. 1 is a block diagram of a conventional clock extraction circuit for a four-phase PSK system.

Description will first be made with reference to FIG. 1, which schematically illustrates the structure of the clock extraction device conventionally used in a four-phase PSK system. Reference numeral 12 indicates a signal splitter circuit to which a four-phase PSK signal is fed through an input terminal 11. The input signal is thus divided into two separate signals; one of which (15) is applied directly to a phase comparator 13, the remaining of which is applied to a delay circuit 14 and delayed an amount of the time corresponding to half the length of time slot. The delayed signal 16 is fed to the phase comparator 13. Generally in a conventional four-phase PSK systems, the phase difference between the signals 15 and 16 is at all times fixed during one half period of time slot and is variable during the other half period of time slot in accordance with the phase difference between two consecutive time slots of the modulated signal wave. As a consequence, a signal 17, which includes a clock component, is obtained at the output of the phase comparator 13. The signal 17 is directed through a narrow-band filter 18 so that only its clock component appears as a clock signal desired at the output terminal 19 of the device. If, however, such clock extraction device be applied for a double-binary PSK signal, the clock component would not be included in the output signal 17 from the phase comparator 13 and no desired clock signal be obtained through filter 18 since the phase difference between the signal inputs 15 and 16 to the comparator 13 varies every half time slot.

Figure 2:
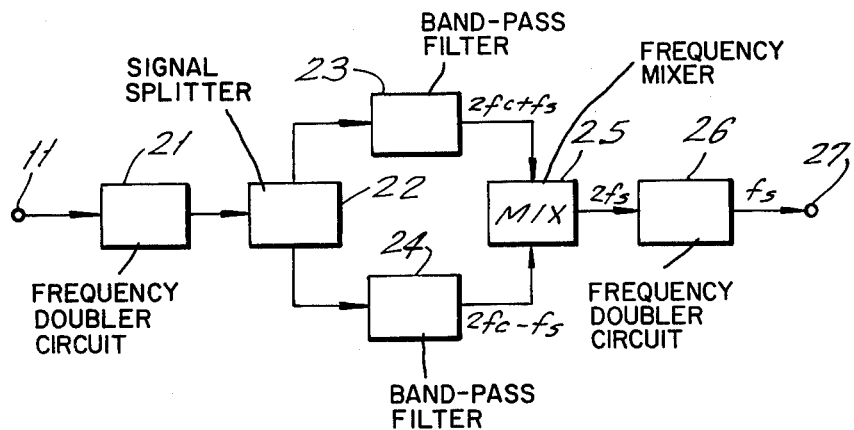
FIG. 2 is a block diagram of a clock extraction circuit for a double-binary PSK system.

FIG. 2 illustrates a form of clock extraction device which is tentatively conceived for use in a double-binary PSK system. As shown, a double-binary PSK signal input is fed through an input terminal 11 to a frequency doubler circuit 21 which generates signals having a frequency of $2f_c+f_s$ and $2f_c-f_s$, respectively, wherein fc is the carrier wave frequency and fs is the clock frequency, and a signal of a frequency spectrum component with a certain spread centering on $2f_c$. These signals are fed into a signal splitter circuit 22 and then to band-pass filters 23 and 24 so that the two signals of $2f_c+f_s$ and $2f_c-f_s$ are separated out, as indicated. The two signals are frequency-mixed in a frequency mixer 25 to produce a signal having a frequency $2f_s$; this signal is converted by a frequency divider 26 into a signal of frequency $f_s$, which appears at an output terminal 27 as a regenerated clock signal. For an analogy of such clock extraction circuit, reference may be had to the article, "A Prototype 60 Mb/s Fast Frequency Shift Keying Modem," by D. D. Taylor et al, in the proceedings, "1976 International Conference on Communication," pp.51-26 to 30.

With such device as shown in FIG. 2, however, the clock signal is extracted only when band-pass filters 23 and 24 produce respective outputs, and the two signals of $2f_c-f_s$ and $2f_c+f_s$ appear at the output of the frequency multiplier or doubler circuit 21 on a timedivision basis. It follows therefore that for clock extraction the band-pass filters 23 and 24 must have a sufficiently narrow bandwidth and this involves the danger of deteriorating the clock acquisition characteristic of the device. Further, in such a device, the regenerated clock signal exhibits a phase ambiguity of 180° due to its passage through the frequency divider 26 and thus cannot be utilized in any immediate fashion.

Figure 3:
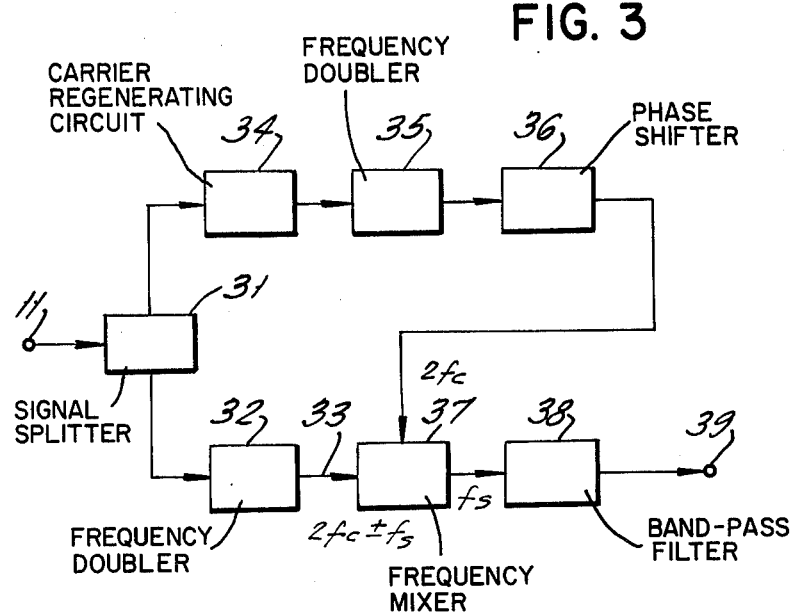
FIG. 3 is a block diagram of a preferred form of clock extraction device for a double-binary PSK system embodying the principles of the present invention.

Description will next be made of a preferred form of clock extraction circuit embodying the present invention, which is illustrated in FIG. 3. A double-binary PSK signal is fed through an input terminal 11 into a signal splitter 31 and divided into two signals, one of which is applied to a frequency doubler 32 to obtain a signal 33, which has a spectrum with bright lines appearing at frequencies $2f_c+f_s$ and $2f_c-f_s$, that is, at frequencies spaced from the frequency equal to twice the carrier wave frequency $f_c$ by an amount equal to the clock frequency $f_s$. The other separated signal is applied to a carrier-wave regenerating circuit 34 to obtain regenerated carrier-wave. The carrier-wave regenerating circuit 34 may principally be the same as that used in a four-phase PSK system. For example, it is arranged such that the input signal is frequency-quadrupled to extract a $4f_c$ component therefrom, which is frequency-divided to obtain a signal of frequency $f_c$. The regenerated carrier wave is fed to a frequency doubler 35, the output of which is directed through a phase shifter 36 to a mixer 37. The phase shifter 36 shifts the phase of the double frequency signal by an amount selected so as to maximize the clock component to be extracted. The phase shifter output signal of frequency $2f_c$ is then frequency-mixed with the output of frequency double 32 in a mixer 37 to obtain a signal having a bright line spectrum at the frequency of $f_s$, which is the differential frequency between the signals frequency-mixed. The mixer output signal, including unwanted components such as noise, is directed through a narrow-band filter 38, which acts to suppress the unwanted components, and the desired clock signal is produced at an output terminal 39.

In this connection, where a double-binary PSK signal is regenerated by synchronized wave detection and instantaneous detection, it is necessary to obtain a clock signal corresponding to the time slots of the synchronous detection signal, which varies a half time slot each time a phase change of 90° or −90° arises in the carrier wave regenerated, due to the phase ambiguity of the carrier-wave regenerating circuit 34. In contrast, according to the clock extraction device of the present invention shown in FIG. 3, any phase change of 90° or −90° arising in the regenerated carrier wave gives rise to a phase change of 180° in the output signal of the frequency doubler 35 and hence in the clock signal extracted. It will thus be observed that the device of the invention operates automatically to follow the variation of the synchronized detection signal.

It is to be noted at this point that in the device of FIG. 3 the frequency doubler 32 may alternatively be inserted before the signal splitter circuit 31; that is, in cases where in the carrier regenerating circuit 34 the carrier wave is to be regenerated in a frequency-quadrupled form, it may be frequency-doubled in advance. Further, it is possible to separate from the frequency-doubled signal two components, respectively of $2f_c+f_s$ and $2f_c-f_s$, by narrow-band filter means and to frequency-mix the summation of the two components separated with the carrier wave regenerated. Such process is effected, for example, by the structure shown in the block diagram of FIG. 4.

As illustrated, in this embodiment, the frequency doubler 32 is inserted before the signal splitter 31 and the components of respective frequencies $2f_c+f_s$ and $2f_c-f_s$ are selected out of the splitter output through respective narrow-band filters 41a and 41b and summed up at a summing circuit 42 to be fed into a mixer circuit 37.

Figure 4:
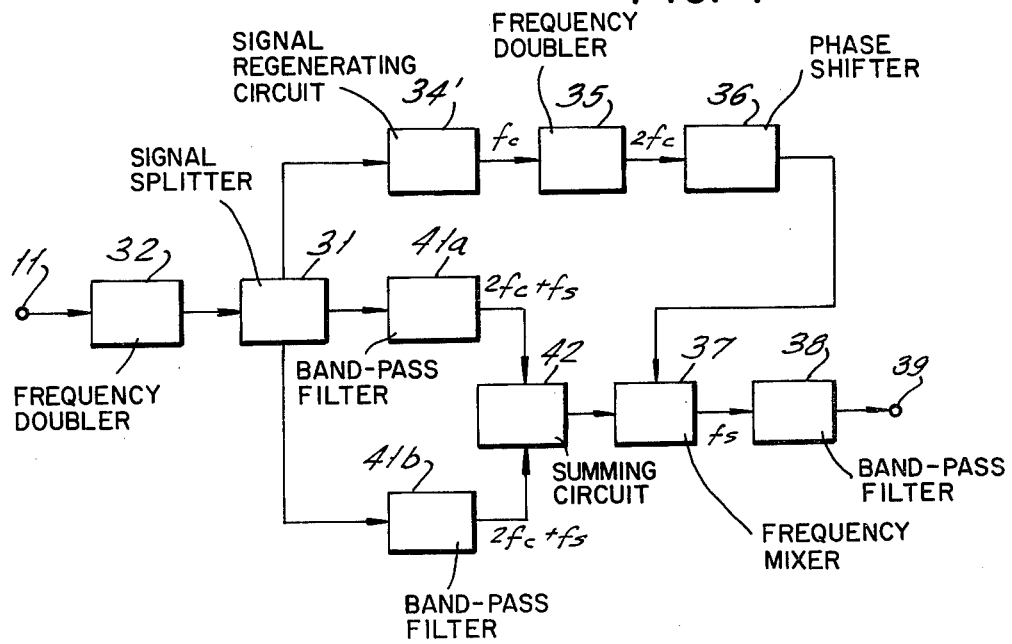
FIG. 4 is a block diagram of another preferred form of clock extraction device embodying the principles of the invention.

Incidentally, where the same regenerating system as used in FIG. 3 is employed, the carrier-wave regenerating circuit 34' in FIG. 4 may be arranged so as to frequency-double the separated signal input thereto and to obtain $f_c$ by frequency division of the frequency-doubled signal, which is of the frequency $4f_c$ as the input signal is fed itself in frequency-doubled form.

A specific example of such clock extraction device will next be described which is used with a carrier-wave frequency of 140 MHz and a clock frequency of 30 MHz. As stated above, the input signal is fed through frequency doubler 32 to signal splitter 31 and one of the signals divided is utilized to regenerate the carrier wave of the frequency of 140 MHz, which is frequency-doubled to 280 MHz. The other signal divided at 31 is directed through 310 MHz and 250 MHz narrow-band filters respectively indicated at 41a and 41b and the filter outputs are combined for summation of 310 MHz and 250 MHz. The sum signal is mixed with the signal of frequency 280 MHz so that the 30 MHz clock is regenerated.

In this instance, the band-pass filter 38, provided to select the clock component out of the output of mixer circuit 37 may have a relatively wide bandwidth. Further, it is to be noted that a satisfactory clock acquisition characteristic can be obtained even if narrow-band filters 41a and 41b have a bandwidth which is less narrow than the bandwidth of band-pass filter 38 in the embodiment of FIG. 3.

It will be appreciated from the foregoing description that the device of the present invention is capable of extracting from a double-binary PSK signal a clock signal which can be utilized immediately as extracted, in a stable manner without involving any ambiguity.

What is claimed is:

1. A circuit for extracting a clock signal from a double-binary PSK-modulated carrier wave, comprising:
   means supplied with said PSK-modulated carrier wave for regenerating the unmodulated carrier wave component of said PSK-modulated carrier wave;
   a first frequency multiplier connected to said regenerating means for doubling the frequency of the said regenerated unmodulated carrier wave component;
   a second frequency multiplier supplied with said PSK-modulated carrier wave for doubling the frequency of said PSK-modulated carrier wave;
   means connected to said first and second frequency multipliers for frequency mixing the outputs of said first and second frequency multipliers; and
   filter means connected to said frequency mixing means for extracting from the output of said frequency mixing means said clock signal.

2. The circuit of claim 1 further including a phase shifter coupled between said first frequency multiplier and said frequency mixer for phase-shifting the output of said first frequency multiplier.

3. A circuit for extracting a clock signal from a double-binary PSK carrier wave, comprising:
   a first frequency multiplier for doubling the frequency of said PSK-modulated carrier wave;
   means connected to said first frequency multiplier for regenerating an unmodulated carrier wave component of said PSK-modulated carrier wave;
   a second frequency multiplier connected to said regenerating means for doubling the frequency of said regenerated unmodulated carrier wave;
   a first band-pass filter connected to said first frequency multiplier and having a central line frequency of $2f_c + f_s$, wherein $f_c$ is the frequency of said PSK-modulated carrier wave and $f_s$ is the frequency of said clock signal;
   a second band-pass filter connected to said first frequency multiplier and having a central line frequency of $2f_c - f_s$;
   a summing circuit connected to said first and second band-pass filters for summing the outputs of said first and second band-pass filters;
   means connected to said summing circuit and said frequency multipliers for frequency mixing the outputs of said summing circuit and said second frequency multiplier; and
   filter means connected to said frequency mixing means for extracting from the output of said frequency mixing means said clock signal.

4. The circuit of claim 3 further including a frequency shifter coupled between said second frequency multiplier and said frequency mixer for phase-shifting the output of said second frequency multiplier.

* * * * *